US008150148B2

(12) United States Patent
Ahn et al.

(10) Patent No.: US 8,150,148 B2
(45) Date of Patent: Apr. 3, 2012

(54) METHOD AND APPARATUS FOR DETECTING PREFERRED COLOR AND LIQUID CRYSTAL DISPLAY DEVICE USING THE SAME

(75) Inventors: Ji Young Ahn, Gyeonggi-do (KR); Dong Woo Kang, Gyeonggi-do (KR); Choon Woo Kim, Seoul (KR); Ji Young Yum, Incheon-si (KR); Byong Tae Ryu, Incheon-si (KR)

(73) Assignee: LG Display Co., Ltd., Seoul (KR)

( * ) Notice: Subject to any disclaimer, the term of this patent is extended or adjusted under 35 U.S.C. 154(b) by 957 days.

(21) Appl. No.: 12/213,548

(22) Filed: Jun. 20, 2008

(65) Prior Publication Data

US 2009/0010531 A1 Jan. 8, 2009

(30) Foreign Application Priority Data

Jun. 21, 2007 (KR) ........................ 10-2007-0061173

(51) Int. Cl.
*G06K 9/00* (2006.01)

(52) U.S. Cl. ......................... 382/162; 345/593; 358/515

(58) Field of Classification Search .......... 382/162–167; 358/500–540; 345/589–610
See application file for complete search history.

(56) References Cited

U.S. PATENT DOCUMENTS

| | | | | |
|---|---|---|---|---|
| 4,594,732 | A * | 6/1986 | Tsuji | 382/174 |
| 7,187,386 | B2 * | 3/2007 | Rice et al. | 345/589 |
| 2003/0053689 | A1 * | 3/2003 | Watanabe et al. | 382/167 |
| 2004/0100478 | A1 * | 5/2004 | Bianchi et al. | 345/690 |
| 2005/0280848 | A1 * | 12/2005 | Seko | 358/1.9 |
| 2006/0203269 | A1 * | 9/2006 | Murayama | 358/1.9 |
| 2007/0230780 | A1 * | 10/2007 | Chen et al. | 382/167 |
| 2008/0240552 | A1 * | 10/2008 | Wang et al. | 382/162 |
| 2009/0046171 | A1 * | 2/2009 | Kogan et al. | 348/223.1 |

* cited by examiner

*Primary Examiner* — Jingge Wu
(74) *Attorney, Agent, or Firm* — Morgan, Lewis & Bockius LLP

(57) ABSTRACT

Disclosed herein are a method and apparatus for detecting a preferred color, which is capable of accurately detecting a preferred-color area with a small amount of computations, and a liquid crystal display device using the same. The method for detecting a preferred color includes comparing a hue value of an input pixel with hue reference values and detecting a first preferred-color pixel, and performing a best linear estimation (BLE) operation with respect to the first preferred-color pixel and detecting a second preferred-color pixel.

13 Claims, 6 Drawing Sheets

METHOD AND APPARATUS FOR DETECTING PREFERRED COLOR AND LIQUID CRYSTAL DISPLAY DEVICE USING THE SAME

This application claims the benefit of Korean Patent Application No. P2007-0061173, filed on Jun. 21, 2007, which is hereby incorporated by reference as if fully set forth herein.

BACKGROUND OF THE INVENTION

1. Field of the Invention

The present invention relates to a display device, and more particularly, to a method and apparatus for detecting a preferred color, which is capable of improving detection capability of a preferred-color area, and a liquid crystal display device using the same.

2. Discussion of the Related Art

High resolution and high definition of an image display device has been realized according to user's requirements. Most users determine the definition of an image on the basis of a preferred color displayed on a display device, such as a skin color, a green color or a blue color. This is because the preferred color is stored in a color storage space of a person so as to have a significant influence on color perception. Accordingly, the image display device uses a preferred color correcting method for detecting a preferred-color area from an input image and converting the detected preferred-color area into a color preferred by the user, in order to display a high-definition image preferred by a user. In the method for correcting the preferred color, since only the preferred-color area should be corrected into a preferred color desired by a user and the other color areas should not be corrected, a method for accurately detecting the preferred-color area necessary for correction of the preferred color from an input image is required.

As a method for detecting the preferred-color area from the input image, a method for deciding an elliptic or rectangular color area using a color distribution of an input image, a method for deciding a color area in hue and saturation ranges using a color distribution of an input image, and a method for discriminating a color using statistics of a color distribution of an input image were reported.

However, in the method for detecting the preferred color using the elliptic area or the rectangular area, if an elliptical model is used, an elliptic equation should be computed with respect to all the pixels of the input image and, if a rectangular model is used, four linear equations should be computed with respect to all the pixels of the input image. Thus, a large amount of computations is required. In addition, the elliptic model is suitable for detection of a skin color, but is not suitable for detection of a green color or a blue color because the green color or the blue color which is distributed over a wide area is unlikely to be defined in the elliptic shape. In the method using the statistics of the color distribution, since a probability should be computed with respect to each pixel and should be compared with a threshold, a large amount of computations is required.

In consideration of the amount of computations of the preferred-color area, the method for detecting the preferred-color area using the hue and saturation ranges is preferable. However, even in this method, since the preferred-color area is detected using only the hue and the saturation, colors other than the preferred color may be included in a detected hue angle range. Therefore, there is a need for a method for accurately detecting a preferred-color area such that only the preferred-color area is corrected with a small amount of computations.

SUMMARY OF THE INVENTION

Accordingly, the present invention is directed to a method and apparatus for detecting a preferred color and a liquid crystal display device using the same that substantially obviate one or more problems due to limitations and disadvantages of the related art.

An object of the present invention is to provide a method and apparatus for detecting a preferred color, which is capable of accurately detecting a preferred-color area with a small amount of computations, and a liquid crystal display device using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for detecting a preferred color includes comparing a hue value of an input pixel with hue reference values and detecting a first preferred-color pixel; and performing a best linear estimation (BLE) operation with respect to the first preferred-color pixel and detecting a second preferred-color pixel.

The method may further include, before the detecting of the first preferred-color pixel, converting R, G and B data of the input pixel into a light (L) data and a and b color difference data into a color coordinate; and calculating the hue value h and a chroma value c of the pixel using the a and b color difference data.

The detecting of the first preferred-color pixel may include comparing the hue value of the input pixel with the hue reference values which are previously set according to preferred colors, detecting the pixel as the first preferred-color pixel if the hue value is included in a hue reference value range of a preferred color, and detecting the pixel as a non-preferred-color pixel if the hue value is not included in any hue reference value range.

The detecting of the second preferred-color pixel may include calculating a preferred-color discrimination constant by a matrix product of an input matrix composed of characteristic data of the first preferred-color pixel and a weight vector matrix composed of weight vectors of the preferred color; and comparing the calculated preferred-color discrimination constant with a reference value of the preferred-color discrimination constant, detecting the pixel as the second preferred-color pixel if the preferred-color discrimination constant is included in a range of the reference value of the preferred-color discrimination constant, and detecting the pixel as the non-preferred-color pixel if the preferred-color discrimination constant is not included in the range of the reference value of the preferred-color discrimination constant.

The detecting of the second preferred-color pixel may be selectively performed according to the preferred colors. That is, the detecting of the second preferred-color pixel may be performed only with respect to the pixels which are detected as the skin-color pixels in the detecting of the first preferred-color pixel.

In another aspect of the present invention, an apparatus for detecting a preferred color includes a color coordinate converter which converts image data of an input pixel into a color coordinate; a hue/chroma calculator which calculates a hue value and a chroma value of the pixel using output data of the color coordinate converter; a first detector which compares the hue value of the input pixel with hue reference values and detects a first preferred-color pixel; and a second detector which performs a best linear estimation (BLE) operation with respect to the first preferred-color pixel and detects a second preferred-color pixel.

The first detector may compare the hue value of the input pixel with the hue reference values which are previously set according to preferred colors, output a first preferred-color detection signal if the hue value is included in a hue reference value range of a preferred color, and output a non-preferred-color detection signal if the hue value is not included in any hue reference value range. The second detector may calculate a preferred-color discrimination constant by a matrix product of an input matrix composed of characteristic data of the first preferred-color pixel and a weight vector matrix composed of weight vectors of the preferred color; compare the calculated preferred-color discrimination constant with a reference value of the preferred-color discrimination constant, output a second preferred-color detection signal if the preferred-color discrimination constant is included in a range of the reference value of the preferred-color discrimination constant, and output the non-preferred-color detection signal if the preferred-color discrimination constant is not included in the range of the reference value of the preferred-color discrimination constant. The second detector may output the second preferred-color detection signal or the non-preferred-color detection signal and output at least a portion of the characteristic data of the pixel.

The second detector may perform the BLE operation only with respect to the pixels which are detected as the skin-color pixels by the first detector.

In another aspect of the present invention, a liquid crystal display device includes a preferred-color detector using the apparatus for detecting the preferred color; a preferred-color corrector which corrects the preferred color of the preferred-color pixel detected by the preferred-color detector using a preferred-color reference value and does not correct the preferred color of the non-preferred-color pixel; and an image display unit which displays data output from the preferred-color corrector.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, exemplary embodiments of the present invention will be described in detail with reference to FIGS. 1 to 8.

In order to accurately detect a preferred color, a method for detecting the preferred color according to an embodiment of the present invention includes a first detection step of detecting the preferred color using hue angles for discriminating the hue of an input image, that is, hue reference values h, and a second detection step of finally detecting the preferred color using a best linear estimation method (hereinafter, referred to as a BLE method). The hue reference values of the preferred colors used in the first detection step and weight vectors and reference values of preferred-color discrimination constants of the preferred colors used in the second detection step should be first decided. Accordingly, before describing the method for detecting the preferred color according to the embodiment of the present invention, a method for setting the reference values and the weight vectors used in the method for detecting the preferred color will be first described.

Figure 1:
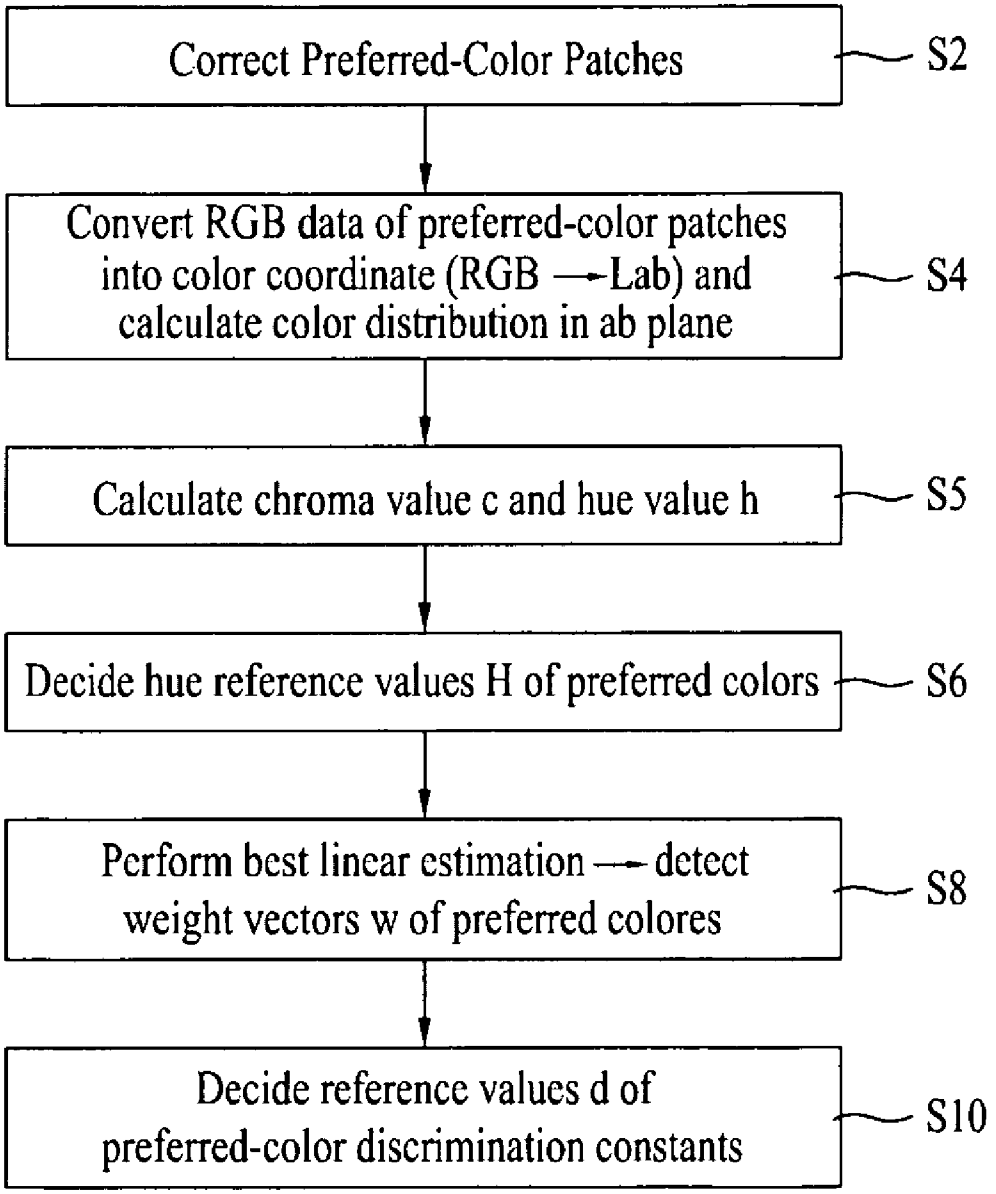
FIG. 1 is a flowchart illustrating a process of detecting a reference value and a weight vector used in a method for detecting a preferred color according to an embodiment of the present invention.

FIG. 1 is a flowchart illustrating a process of setting reference values and weight vector matrixes used in the method for detecting the preferred color according to the embodiment of the present invention.

In a step 2 (S2), preferred-color patches of a skin color, a green color and a blue color are collected and a preferred-color database is generated. A plurality of images including preferred-color areas are collected from a web, and the preferred-color patches each having a predetermined size are extracted from the collected images and are stored in the preferred-color database. The preferred-color database includes categories of the skin color, the green color and the blue color and the preferred-color patches extracted from the collected images are stored according to the preferred-color categories. For example, a skin-color patch having a size of 20×20 is extracted from a skin image and is stored in a skin-color category of the database, a green-color patch GP having a size of 20×20 is extracted from a lawn image and is stored in a green-color category of the database, and a blue-color patch BP having a size of 20×20 is extracted from a sky image and is stored in a blue-color category of the database.

Figure 2A:
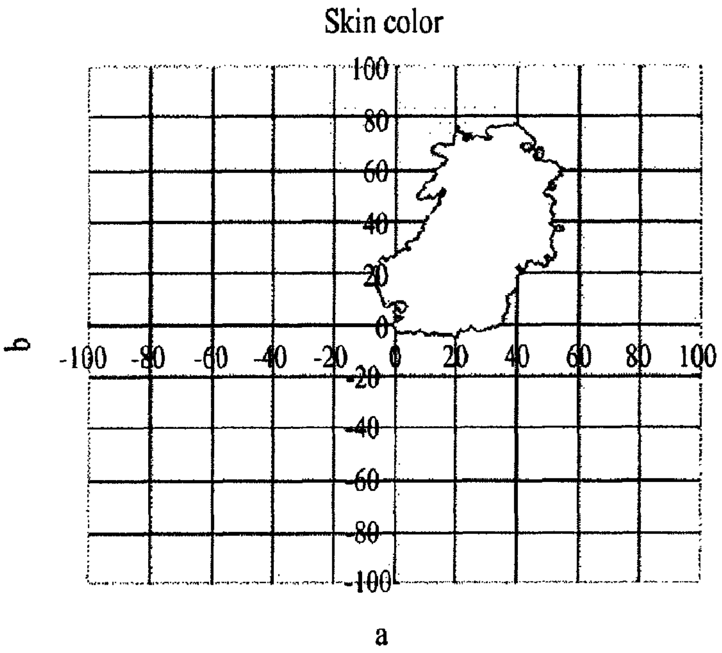
FIGS. 2A to 2C are views showing preferred-color distributions calculated in a step 4 shown in FIG. 1.
Figure 2B:
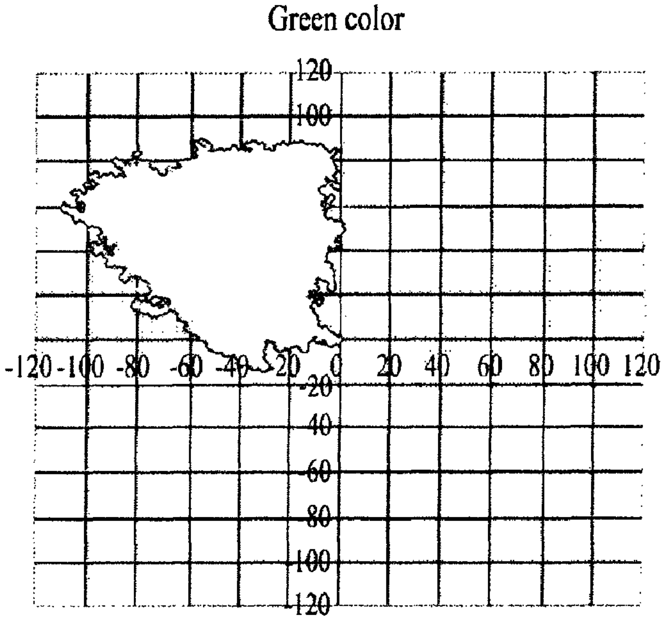
Figure 2C:
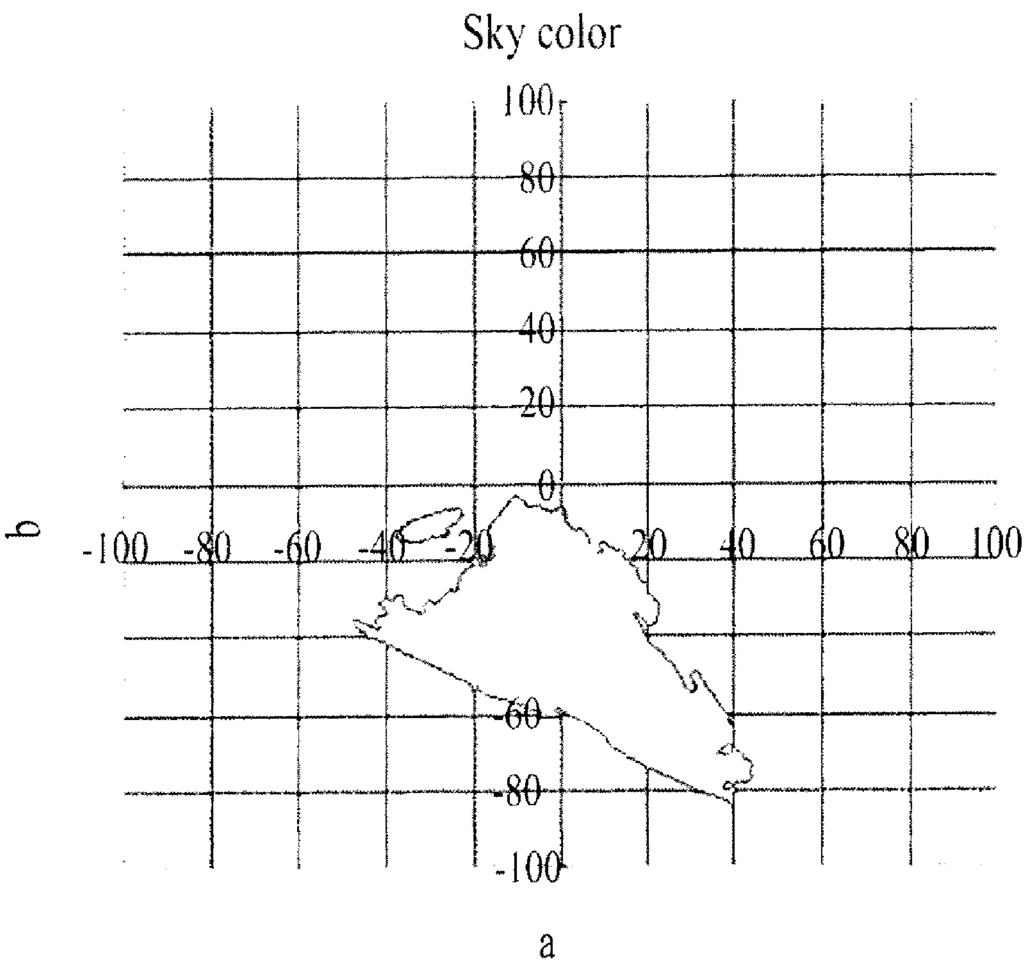

In a step 4 (S4), the pixel data RGB of the preferred-color patches stored in the database is converted into an Lab color coordinate and a preferred-color distribution of the Lab color coordinate is calculated according to the preferred-color categories. First, the pixel data RGB of the preferred-color patches is converted into an XYZ color coordinate using the characteristics of a liquid crystal display device, for example, a matrix which compensates for a black error component due to a backlight and has gamma characteristics. Then, the XYZ color coordinate including the characteristics of the liquid crystal display device is converted into the Lab color coordinate so as to detect the preferred-color distribution characteristics of an ab plane according to the preferred-color categories as shown in FIGS. 2A to 2C. In the Lab color coordinate system, an "L" component indicates lightness, an "a" component indicates a red-green color difference component, and a "b" component indicates a yellow-blue color difference component. FIG. 2A shows the color distribution of the skin color detected from the skin-color patches. From FIG. 2A, it can be seen that a skin-color coordinate is distributed in a first quadrant. FIG. 2B shows the color distribution of the green color detected from the green-color patches. From FIG. 2B, it can be seen that a green-color coordinate is distributed in a second quadrant. FIG. 2C shows a color distribution of the blue color detected from the blue-color patches. From FIG. 2C, it can be seen that a blue-color coordinate is distributed in third and fourth quadrants.

In a step 5 (S5), a chroma value c representing the saturation of the color and the hue value h representing an angle for discriminating the hue are calculated using a and b color difference components as expressed by Equations 1 and 2.

$$C=\sqrt{a^2+b^2} \qquad \text{Equation 1}$$

$$H=\tan^{-1}\frac{b}{a} \qquad \text{Equation 2}$$

Here, the hue value h indicates the angle of a straight line for connecting an original point with coordinates in an ab plane shown in FIGS. 2A to 2C.

Then, in a step 6 (S6), the hue reference values H are decided according to the preferred-color categories using the preferred-color distributions shown in FIGS. 2A to 2C, as shown in Table 1.

TABLE 1

| | Minimum | Maximum | Average | Reference range (H) |
|---|---|---|---|---|
| Skin color | −20.97° | 101.38° | 45.8° | 11° ≦ Hs ≦ 79° |
| Green color | 40° | 193° | 132° | 79° < Hg ≦ 186° |
| Blue color | 196.48° | 307° | 268.1° | 200° ≦ Hb ≦ 315° |

For example, the hue reference values H of the preferred colors are set by detecting the hue values h included in reliable sections of 90 to 95% of the preferred-color distributions shown in FIGS. 2A to 2C. As shown in Table 1, the hue reference value Hs of the skin color is in a range greater than or equal to 11° and less than or equal to 79° (11°≦Hs≦79°), the hue reference value Hg of the green color is in a range greater than 79° and less than or equal to 186° (79°≦Hg≦186°), and the hue reference value Hb of the blue color is in a range greater than or equal to 200° and less than or equal to 315° (200°≦Hb≦315°).

Next, in a step 8 (S8), the weight vectors w are calculated according to the preferred-color categories using the BLS method. In the BLS method, the weight vectors are computed using training samples and it is determined whether an input pixel belongs to a specific group, that is, a specific preferred color, by products of input values and the weight vectors. The training samples which are divided according to the categories include preferred-color patches and non-preferred-color patches, for discrimination of the preferred colors. For example, the training sample of the skin color includes skin-color patches and non-preferred-color patches representing a red color. The training method using the training samples are expressed by Equation 3

$$\begin{bmatrix} L_0 & a_0 & b_0 & c_0 & h_0 & R_0 & G_0 & B_0 \\ L_1 & a_1 & b_1 & c_1 & h_1 & R_1 & G_1 & B_1 \\ \vdots & \vdots & \vdots & \vdots & \vdots & \vdots & \vdots & \vdots \\ L_{N-1} & a_{N-1} & b_{N-1} & c_{N-1} & h_{N-1} & R_{N-1} & G_{N-1} & B_{N-1} \\ L'_0 & a'_0 & b'_0 & c'_0 & h'_0 & R'_0 & G'_0 & B'_0 \\ \vdots & \vdots & \vdots & \vdots & \vdots & \vdots & \vdots & \vdots \\ L'_{M-1} & a'_{M-1} & b'_{M-1} & c'_{M-1} & h'_{M-1} & R'_{M-1} & G'_{M-1} & B'_{M-1} \end{bmatrix} \qquad \text{Equation 3}$$

$$\begin{bmatrix} w_0 \\ w_1 \\ w_2 \\ w_3 \\ w_4 \\ w_5 \\ w_6 \\ w_7 \end{bmatrix} = \begin{bmatrix} d_0 \\ d_1 \\ \vdots \\ d_{N-1} \\ d'_0 \\ \vdots \\ d'_{M-1} \end{bmatrix} = > A \cdot W = D$$

In Equation 3, a matrix A corresponding to the training sample includes an N×8 matrix composed of the lightness L, the a component, the b component, the chroma value c, the hue value h, R data, G data and B data which are eight pieces of characteristic data of N (N is a natural number) pixels configuring the preferred-color patch, that is, N preferred pixels. In addition, the matrix A includes an M×8 matrix composed of eight characteristic vectors L', a', b', c', h', R', G' and B' of M (M is a natural number) non-preferred-color pixels, for discrimination of the preferred color and the non-preferred color. The characteristic vectors L', a', b', c', h', R', G' and B' of the non-preferred-color pixel are calculated from the non-preferred-color patches by the steps 2 to 5 (S2 to S5).

A weight vector matrix W is composed of an 8×1 matrix including the eight characteristic vectors L, a, b, c, h, R, G and B of the pixels and the weight vectors $w_0$ to $w_7$ corresponding thereto.

A matrix D which is a product of the matrix A and the weight vector matrix W includes an N×1 matrix composed of preferred-color discrimination constants $d_0$ to $d_{N-1}$ calculated by a matrix product of the N×8 matrix composed of the characteristic vectors L, a, b, c, h, R, G and B of the preferred-color pixel and the weight vectors $w_0$ to $w_7$. In addition, the matrix D includes an M×1 matrix composed of non-preferred-color discrimination constants $d'_0$ to $d'_{M-1}$ calculated by a matrix product of the N×8 matrix composed of the characteristic vectors L', a', b', c', h', R', G' and B' of the non-preferred-color pixel and the weight vectors w0 to w7. Here, the preferred-color discrimination constants $d_0$ to $d_{N-1}$ and the non-preferred-color discrimination constants $d'_0$ to $d'_{M-1}$ may be arbitrarily set by a designer. For example, the preferred-color discrimination constants $d_0$ to $d_{N-1}$ may be set to '1' and the non-preferred-color discrimination constants $d'_0$ to $d'_{M-1}$ may be set to '−1'.

The weight vector matrix W is detected according to the preferred-color categories using the matrix A composed of the characteristic vectors of the preferred-color patches and the non-preferred-color patches and the matrix D composed of the preferred-color discrimination constants and the non-preferred-color discrimination constants as expressed by Equation 4. The weight vector matrix W of each of the preferred colors is composed of the weight vectors $w_0$ to $w_7$ of the characteristic vectors L, a, b, c, h, R, G and B of each of the preferred colors.

$$W=(A^T \cdot A)^{-1} \cdot D \qquad \text{Equation 4}$$

In Equation 4, since the matrix A is not a square matrix, a product $A^T \cdot A$ of a transposed matrix $A^T$ of the matrix A and the matrix A is first obtained and an inverse matrix $(A^T \cdot A)^{-1}$ of the matrix product $A^T \cdot A$ is multiplied by the matrix D, thereby detecting the weight vector matrix W composed of the weight vectors $w_0$ to $w_7$ of the characteristic vectors L, a, b, c, h, R, G and B of each of the preferred colors. Since the weight vector matrixes W of the preferred-color categories are detected, a skin-color weight vector matrix Ws, a green-color weight vector matrix Wg and a blue-color weight vector matrix Wb are respectively detected.

Then, in a step 10 (S10), reference values d of the preferred-color discrimination constants are decided using the weight vector matrix W detected in the step S8 and preferred-color image samples different from the preferred-color patches. The preferred-color discrimination constants are calculated by the product of the characteristic vectors L, a, b, c, h, R, G and B of each pixel configuring any preferred-color image sample and the weight vector matrixes W. Then, the reference values d of the preferred-color discrimination constants of the preferred-color categories are set using the calculated preferred-color discrimination constants. For example, the reference values d of the preferred-color discrimination constants of the preferred colors are set as shown in Table 2.

TABLE 2

| Preferred color | Skin color | Green color | Blue color |
|---|---|---|---|
| Reference value of preferred-color discrimination constant | $0.5 < ds < 1.5$ | $0.6 < dg < 1.4$ | $0.6 < db < 1.4$ |

In the method for detecting the preferred color according to the embodiment of the present invention, the preferred color is detected from the input image using the hue reference values H, the weight vector matrixes W and the reference values of the preferred-color discrimination constants detected according to the preferred-color categories by the above-described process.

Meanwhile, the step S8 of detecting the weight vectors and the step 10 (S10) of deciding the reference values of the preferred-color discrimination constants may be selectively performed according to the preferred-color categories. For example, the weight vector and the reference value of the preferred-color discrimination constant may be detected only with respect to the skin color and the weight vectors and the reference values of the preferred-color discrimination constants may not be detected with respect to the green color and the blue color.

Figure 3:
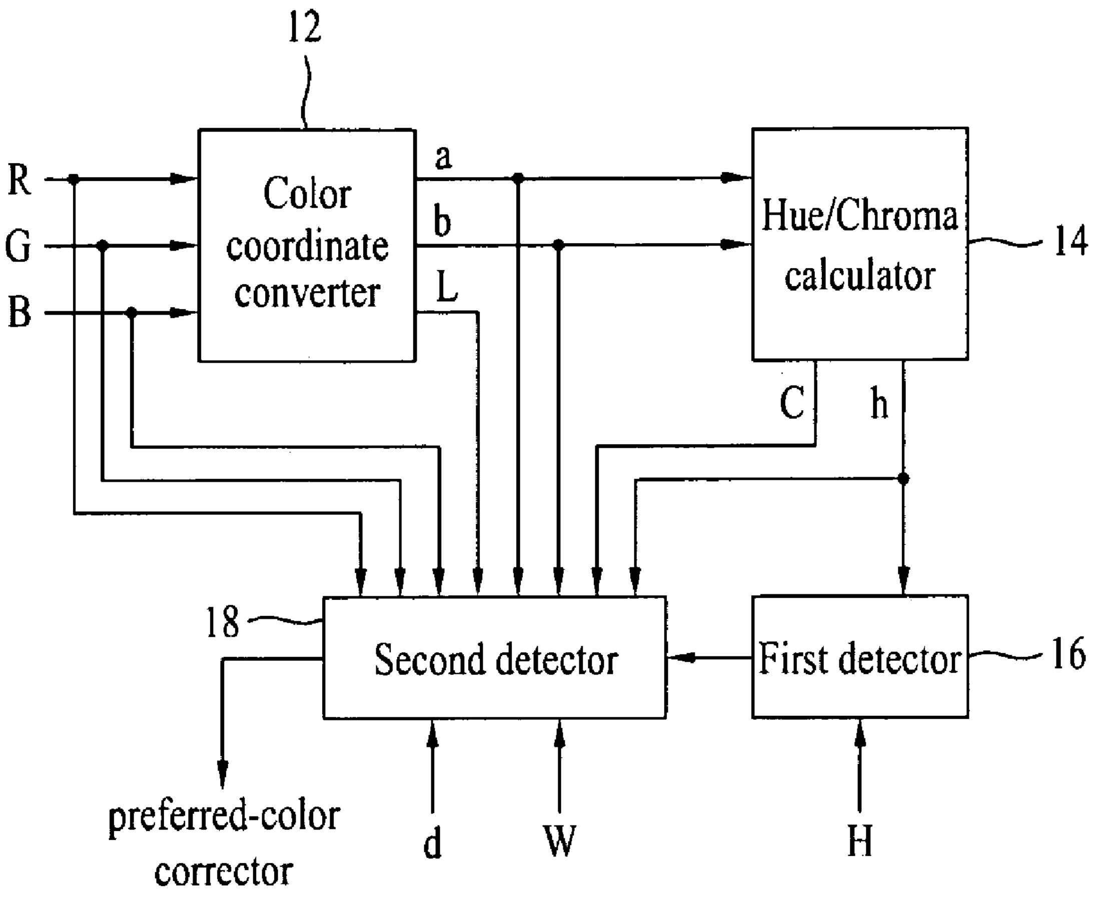
FIG. 3 is a block diagram showing a preferred-color detector according to an embodiment of the present invention.

FIG. 3 is a block diagram showing a preferred-color detector according to the embodiment of the present invention.

Figure 4:
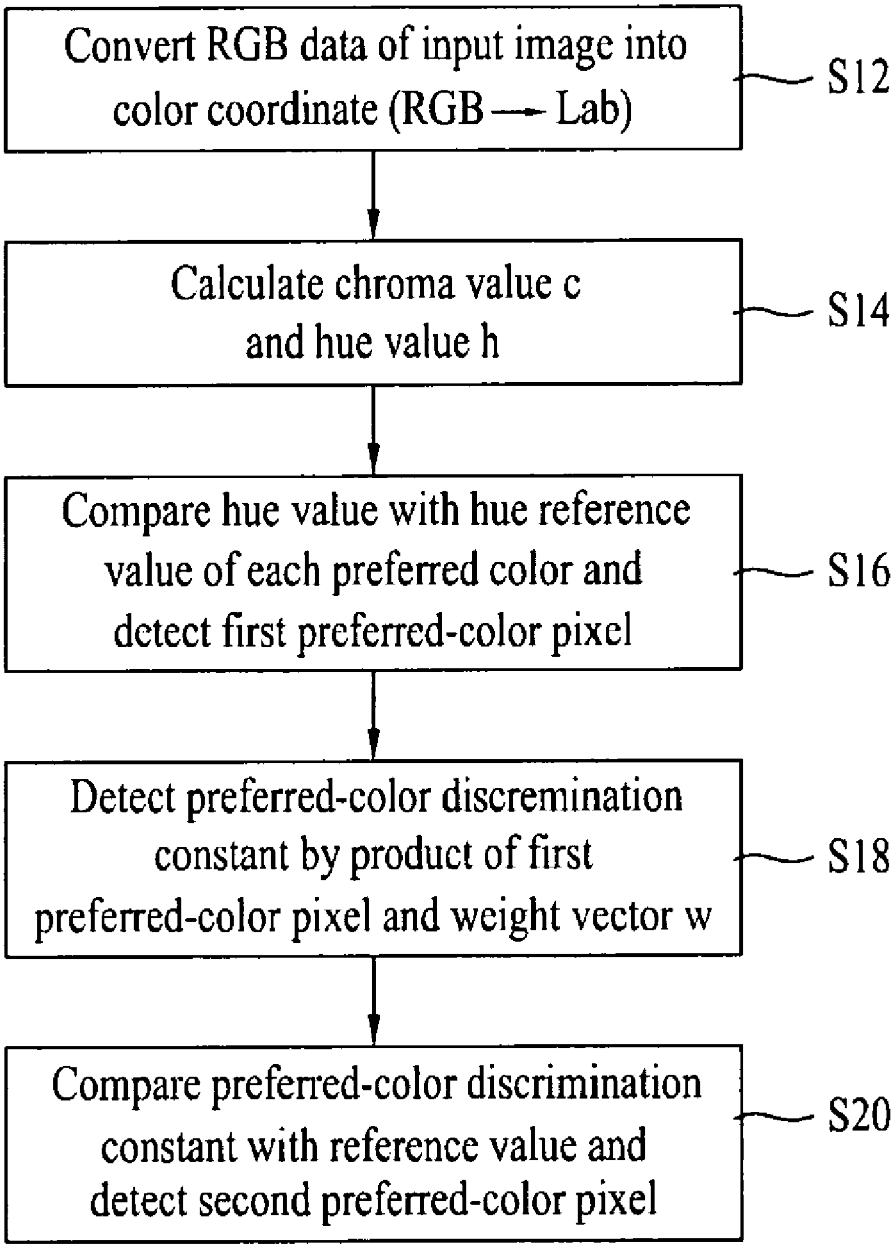
FIG. 4 is a flowchart illustrating the method for detecting the preferred color according to the present invention.

FIG. 4 is a flowchart illustrating the method for detecting the preferred color according to the present invention.

The preferred-color detector shown in FIG. 3 includes a color coordinate converter 12 for converting input data R, G and B into an Lab color coordinate, a chroma/hue calculator 14 for calculating the chroma value c and the hue value h using the a and b color difference data from the color coordinate converter 12, a first detector 16 for comparing the hue value h from the chroma/hue calculator 14 with the hue reference value H of each preferred color and detecting a first preferred-color pixel, and a second detector 18 for performing the BLE operation with respect to the preferred-color pixel detected by the first detector 16 and detecting a second preferred-color pixel. The preferred-color detector shown in FIG. 3 will be described together with the method for detecting the preferred color shown in FIG. 4.

The color coordinate converter 12 converts the input data R, G and B of the pixel into the Lab color coordinate and outputs data L, a and b (S12). The color coordinate converter 12 selects and outputs the data L, a and b corresponding to the input data R, G and B by a mapping method using a lookup table.

The chroma/hue calculator 14 calculates the chroma value c and the hue value h of the pixel using the a and b data as expressed by Equations 1 and 2 (S14).

The first detector 16 compares the hue value h from the chroma/hue calculator 14 with the reference value H of each preferred color, detects the first preferred-color pixel, and outputs a first preferred-color detection signal (S16). The hue reference value H of each preferred color is decided in the step 6 (S6) of FIG. 1 and is stored in a memory (not shown). The hue reference value H includes the hue reference value Hs of the skin color, the hue reference value Hg of the green color and the hue reference value Hb of the blue color as shown in Table 1. The first detector 16 compares the received hue value h with the hue reference value ($11° \leqq Hs \leqq 79°$) of the skin color, the hue reference value ($79° < Hg \leqq 186°$) of the green color and the hue reference value ($200° \leqq Hb \leqq 315°$) of the blue color, detects the first preferred color, and outputs the first preferred-color detection signal. The first preferred-color detection signal indicates that the input pixel is the preferred-color pixel and indicates the preferred color corresponding to the input pixel. For example, the first detector 16 outputs a skin-color detection signal if the hue value h of the input pixel is included in the range of the hue reference value Hs of the skin color, outputs a green-color detection signal if the hue value h is included in the range of the hue reference value Hg of the green color, and outputs a blue-color detection signal if the hue value h is included in the range of the hue reference value Hb of the blue color. The first detector 16 outputs a non-preferred-color detection signal indicating that the pixel is the non-preferred-color pixel, if the hue value h of the input pixel is not included in any one of the reference values H of the preferred colors.

The second detector 18 performs the BLE operation with respect to the pixel corresponding to the first preferred-color detection signal from the first detector and calculates the preferred-color discrimination constant (S18). Then, the second detector 18 compares the calculated preferred-color discrimination constant with the reference values d of the preferred-color discrimination constants and detects the second preferred-color pixel (S20).

In more detail, the second detector 18 performs the BLE operation with respect to the pixel if the first preferred-color detection signal is received from the first detector 16 and does not perform the BLE operation with respect to the pixel if the first non-preferred-color detection signal is received. The second detector 18 calculates a 1×1 preferred-color discrimination constant by calculating a matrix product of a 1×8 input matrix A composed of the characteristic vectors, that is, the characteristic data, of the input pixel received from the color coordinate converter 12, the chroma/hue calculator 14 and an external unit and an 8×1 weight vector matrix W composed of the weight vectors $w_0$ to $w_7$ of each preferred color, in response to the first preferred-color detection signal. The weight vector matrix W is detected in the step 8 (S8) of FIG. 1 and is previously stored in a memory (not shown). The weight vector matrix W includes the skin-color weight vector matrix Ws, the green-color weight vector matrix Wg and the blue-color weight vector matrix Wb.

For example, the second detector 18 calculates the matrix product of the input matrix A and the skin-color weight vector matrix Ws and calculates the skin-color discrimination constant if the first skin-color detection signal is received from the first detector 16, calculates the matrix product of the input matrix A and the green-color weight vector matrix Wg and calculates the green-color discrimination constant if the first green-color detection signal is received, and calculates the matrix product of the input matrix A and the blue-color weight vector matrix Wb and calculates the blue-color discrimination constant if the first blue-color detection signal is received.

The second detector 18 compares the preferred-color discrimination constant calculated in the step 18 (S18) with the reference value d of the preferred-color discrimination constant, finally determines whether the input pixel is the preferred-color pixel or not, detects the second preferred-color pixel, and outputs the second preferred-color pixel (S20). The reference value d of the preferred-color discrimination constant is decided in the step 10 (S10) of FIG. 1 and is previously stored in a memory (not shown). The reference value d of the preferred-color discrimination constant includes a reference value ds of a skin-color discrimination constant, a reference value dg of a green-color discrimination constant and a reference value db of a blue-color discrimination constant. The second detector 18 outputs a second skin-color detection signal to the preferred-color corrector if the skin-color discrimination constant is included in the range of the reference value ds of the skin-color discrimination constant, outputs a second green-color detection signal if the green-color discrimination constant is included in the range of the reference value dg of the green-color discrimination constant, and outputs a second blue-color detection signal if the blue-color discrimination constant is included in the range of the reference value db of the blue-color discrimination constant. In contrast, the second detector 18 outputs a non-preferred-color detection signal to the preferred-color corrector if the preferred-color discrimination constant is not included in the range of the reference value d of the preferred-color discrimination signal or if the non-preferred-color detection signal is received from the first detector 18. The second detector 18 outputs characteristic data necessary for correction of the preferred color of the characteristic data L, a, b, c, h, R, G and B of the pixel, for example, the data L, a and b or data L, C and H, to the preferred-color corrector, together with the second preferred-color detection signal or the non-preferred-color signal.

Since the method for detecting the preferred color according to the present invention uses a dual preferred-color detecting method including the steps of detecting the first preferred color using the hue value and detecting the second preferred color using the BLE operation, it is possible to accurately detect the preferred-color pixel for correction of the preferred colors, that is, the preferred-color areas, using the hue value necessary for a relatively small amount of computations.

A preferred-color detector according to another embodiment of the present invention can selectively perform the second preferred-color detecting step using the BLE operation, including the step 18 (S18) and the step 20 (S20), according to the preferred colors, in order to reduce the amount of computations. In other words, the preferred-color detector can detect the skin-color pixel using the dual preferred-color detecting method of the first and second detectors 16 and 18 and detect the green-color pixel and the blue-color pixel having more excellent preferred-color detection capability than, that of the skin color using only the first preferred-color detecting method, in order to reduce the amount of computations.

For example, the second detector 18 performs the step 18 (S18) and the step 20 (S20) with respect to the pixel which is detected as the skin-color pixel by the first detector 16, determines whether the pixel is the skin-color pixel, outputs the second skin-color detection signal together with the characteristic data LCH (Lab) of the pixel if it is determined that the pixel is the skin-color pixel, and outputs the non-preferred-color detection signal together with the characteristic data LCH (Lab) of the pixel if it is determined that the pixel is not the skin-color pixel. In contrast, the second detector 18 outputs the first green-color detection signal or the second blue-color detection signal from the first detector 16 and the characteristic data LCH (Lab) of the pixel without performing the second preferred-color detecting step including the steps 18 (S18) and 20 (S20). In this case, the weight vector matrixes Wg and Wb of the green color and the blue color, the reference value dg of the green-color discrimination constant and the reference value db of the blue-color discrimination constant are unnecessary. Accordingly, only the weight vector matrix Ws of the skin color and the reference value ds of the skin-color discrimination constant can be detected even in the step S8 of detecting the weight vectors and the step S10 of deciding the reference values of the preferred-color discrimination constants shown in FIG. 1.

Figure 5:
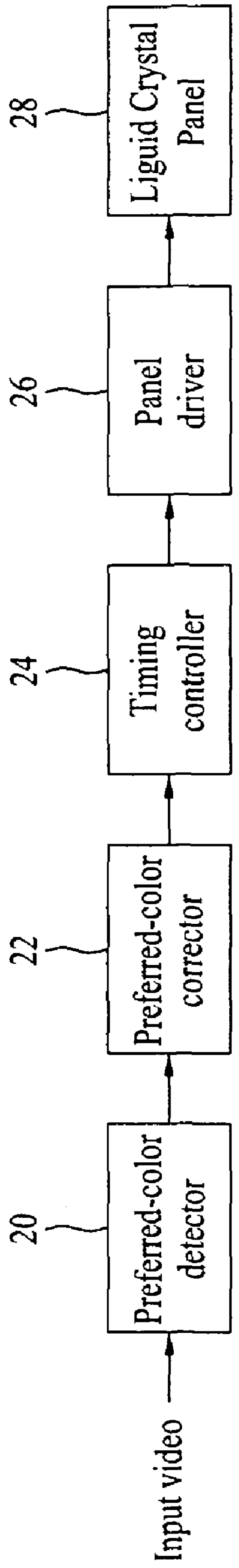
FIG. 5 is a block diagram showing a liquid crystal display device using a preferred-color detector according to an embodiment of the present invention.

FIG. 5 is a schematic block diagram showing a liquid crystal display device using a preferred-color detector according to an embodiment of the present invention.

The liquid crystal display device shown in FIG. 4 includes a preferred-color detector 20, a preferred-color corrector 22, a timing controller 24, a panel driver 26 and a liquid crystal panel 28.

As shown in FIG. 3, the preferred-color detector 20 detects the first preferred-color pixel by the first detector 16 using the hue value h, and finally determines whether the first preferred-color pixel is the preferred-color pixel using the BLE operation so as to detect the second preferred-color pixel by the second detector 18. The preferred-color detector 20 outputs the second preferred-color detection signal indicating the preferred color and the characteristic data LCH (Lab) of the pixel to the preferred-color corrector 22. If it is determined that the pixel is the non-preferred-color pixel by the first or second detector 16 or 18, the preferred-color detector 20 outputs the non-preferred-color detection signal indicating the non-preferred color and the characteristic data LCH (Lab) of the pixel to the preferred-color corrector 20.

Meanwhile, in order to reduce the amount of computations, the preferred-color detector 20 detects the skin-color pixel by the dual preferred-color detecting method using the first and second detector 16 and 18 and detects the green-color pixel and the blue-color pixel by only the first preferred-color detecting method using the first detector 16.

The preferred-color corrector 22 corrects the characteristic data LCH (Lab) of the pixel from the preferred-color detector 20 to the color preferred by the person when the preferred-color detection signal is received from the preferred-color detector 20 and does not perform the correction of the preferred color when the non-preferred-color detection signal is received. For example, when the preferred-color detection signal is received from the preferred-color detector 20, the preferred-color corrector 22 compares the characteristic data LCH (Lab) of the pixel with the reference value of the Lab (LCH) of the color preferred by the person, compensates for the characteristic data LCH (Lab) of the pixel by the difference with the reference value, and outputs the characteristic data L'C'H (L'a'b') of the pixel of which the preferred color is corrected. Then, the preferred-color corrector 22 inversely converts the data L'C'H (L'a'b') of the pixel, of which the preferred color is corrected, into RGB data including the LCD characteristics and outputs the RGB data to the timing controller 24. In contrast, when the non-preferred-color detection signal is received from the preferred-color detector 20, the preferred-color corrector 22 inversely converts the characteristic data LCH (Lab) of the pixel into RGB data including the LCD characteristics and outputs the RGB data to the timing controller 24, without performing the correction of the preferred color.

The timing controller 24 aligns and outputs the RGB data from the preferred-color corrector 22 to the panel driver 26 and generates control signals for controlling driving timings of the panel driver 26 to the panel driver 26.

The panel driver 26 includes a data driver for driving data lines of the liquid crystal panel 28 and a gate driver for driving gate lines. The data driver converts the RGB data from the timing controller 24 into analog data and outputs the analog data to the data lines of the liquid crystal panel 28. The gate driver sequentially drives the gate lines of the liquid crystal panel 28 in response to the control signals of the timing controller 24.

The liquid crystal panel 28 on which a plurality of pixels are arranged in a matrix displays the image. The pixels exhibits its desired colors by a combination of red, green and blue sub-pixels of which light transmission is adjusted by changing the liquid crystal arrangement according to data signals. The sub-pixels charge difference voltages between the data signals supplied to pixel electrodes through thin-film transistors and a common voltage supplied to a common electrode so as to drive the liquid crystal. The liquid crystal panel 28 can display an image with excellent image quality with colors preferred by the person using the preferred-color detector 20 and the preferred-color corrector 22.

As described above, since the method and apparatus for detecting the preferred color according to the present invention uses the dual preferred-color detecting method including the first preferred-color detecting method using the hue value and the second preferred-color detecting method using the BLE operation, it is possible to accurately detect the preferred-color pixel for correction of the preferred color, that is, the preferred-color areas, using the hue value necessary for a relatively small amount of computations.

In the method and apparatus for detecting the preferred color according to the present invention, since the dual preferred-color detecting method and the first preferred-color detecting method are selectively performed according to the categories of the preferred colors, it is possible to reduce the amount of computations.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for detecting a preferred color, the method comprising:

comparing a hue value of an input pixel with hue reference values and detecting a first preferred-color pixel; and performing a best linear estimation (BLE) operation with respect to the first preferred-color pixel and detecting a second preferred-color pixel, wherein the detecting of the second preferred-color pixel includes:

calculating a preferred-color discrimination constant by a matrix product of an input matrix composed of characteristic data of the first preferred-color pixel and a weight vector matrix composed of weight vectors of the preferred color; and comparing the calculated preferred-color discrimination constant with a reference value of the preferred-color discrimination constant, detecting the pixel as the second preferred-color pixel if the preferred-color discrimination constant is included in a range of the reference value of the preferred-color discrimination constant, and detecting the pixel as the non-preferred-color pixel if the preferred-color discrimination constant is not included in the range of the reference value of the preferred-color discrimination constant.

2. The method according to claim 1, further comprising, before the detecting of the first preferred-color pixel, converting R, G and B data of the input pixel into a light (L) data and a and b color difference data into a color coordinate; and calculating the hue value h and a chroma value c of the pixel using the a and b color difference data.

3. The method according to claim 2, wherein the detecting of the first preferred-color pixel comprises comparing the hue value of the input pixel with the hue reference values which are previously set according to preferred colors, detecting the pixel as the first preferred-color pixel if the hue value is included in a hue reference value range of a preferred color, and detecting the pixel as a non-preferred-color pixel if the hue value is not included in any hue reference value range.

4. The method according to claim 1, wherein the characteristic data of the pixel includes L, a, b, c, h, R, G and B and the weight vector matrix is composed of the weight vectors of the characteristic data.

5. The method according to claim 1, wherein the detecting of the second preferred-color pixel is selectively performed according to the preferred colors.

6. The method according to claim 5, wherein the detecting of the second preferred-color pixel is performed only with respect to the pixels which are detected as the skin-color pixels in the detecting of the first preferred-color pixel.

7. The method according to claim 1, further comprising previously setting the hue reference values, and the weight vector matrix and the reference value of the preferred-color discrimination constant used in the BLE operation, according to the preferred colors, using preferred-color patches which are separately collected.

8. An apparatus for detecting a preferred color, the apparatus comprising:

a color coordinate converter which converts image data of an input pixel into a color coordinate;

a hue/chroma calculator which calculates a hue value and a chroma value of the pixel using output data of the color coordinate converter;

a first detector which compares the hue value of the input pixel with hue reference values and detects a first preferred-color pixel; and a second detector which performs a best linear estimation (BLE) operation with respect to the first preferred-color pixel and detects a second preferred-color pixel, wherein the second detector:

calculates a preferred-color discrimination constant by a matrix product of an input matrix composed of characteristic data of the first preferred-color pixel and a weight vector matrix composed of weight vectors of the preferred color;

compares the calculated preferred-color discrimination constant with a reference value of the preferred-color discrimination constant, outputs a second preferred-color detection signal if the preferred-color discrimination constant is included in a range of the reference value of the preferred-color discrimination constant, and outputs the non-preferred-color detection signal if the preferred-color discrimination constant is not included in the range of the reference value of the preferred-color discrimination constant.

9. The apparatus according to claim 8, wherein the first detector compares the hue value of the input pixel with the hue reference values which are previously set according to preferred colors, outputs a first preferred-color detection signal if the hue value is included in a hue reference value range of a preferred color, and outputs a non-preferred-color detection signal if the hue value is not included in any hue reference value range.

10. The apparatus according to claim 8, wherein the second detector outputs the second preferred-color detection signal or the non-preferred-color detection signal and outputs at least a portion of the characteristic data of the pixel.

11. The apparatus according to claim 10, wherein the second detector performs the BLE operation only with respect to the pixels which are detected as the skin-color pixels by the first detector.

12. The apparatus according to claim 8, wherein the hue reference values, and the weight vector matrix and the reference value of the preferred-color discrimination constant used in the BLE operation are previously set and stored according to the preferred colors.

13. A liquid crystal display device comprising:

a preferred-color detector using the apparatus for detecting the preferred color according to any one of claims 8, 9 and 10 to 12;

a preferred-color corrector which corrects the preferred color of the preferred-color pixel detected by the preferred-color detector using a preferred-color reference value and does not correct the preferred color of the non-preferred-color pixel; and an image display unit which displays data output from the preferred-color corrector.

* * * * *